(12) United States Patent
Zeulner et al.

(10) Patent No.: US 11,383,441 B2
(45) Date of Patent: Jul. 12, 2022

(54) APPARATUS FOR ADDITIVELY MANUFACTURING OF THREE-DIMENSIONAL OBJECTS

(71) Applicant: CONCEPT LASER GMBH, Lichtenfels (DE)

(72) Inventors: Fabian Zeulner, Lichtenfels (DE); Christian Dicken, Weidenberg (DE); Stephan Hunze, Pirna (DE)

(73) Assignee: CONCEPT LASER GMBH, Lichtenfels (DE)

( * ) Notice: Subject to any disclaimer, the term of this patent is extended or adjusted under 35 U.S.C. 154(b) by 243 days.

(21) Appl. No.: 16/104,447

(22) Filed: Aug. 17, 2018

(65) Prior Publication Data
US 2019/0061253 A1    Feb. 28, 2019

(30) Foreign Application Priority Data

Aug. 25, 2017  (EP) .................................... 17187994

(51) Int. Cl.
| | |
|---|---|
| *B29C 64/268* | (2017.01) |
| *B29C 64/153* | (2017.01) |
| *B29C 64/386* | (2017.01) |
| *B23K 26/70* | (2014.01) |
| *B23K 26/067* | (2006.01) |
| *B33Y 30/00* | (2015.01) |
| *B33Y 50/00* | (2015.01) |
| *B22F 12/00* | (2021.01) |

(Continued)

(52) U.S. Cl.
CPC ............ *B29C 64/268* (2017.08); *B22F 12/00* (2021.01); *B23K 26/067* (2013.01); *B23K 26/705* (2015.10); *B28B 1/001* (2013.01); *B29C 64/153* (2017.08); *B29C 64/386* (2017.08); *B33Y 10/00* (2014.12); *B33Y 30/00* (2014.12); *B33Y 50/00* (2014.12); *B22F 10/10* (2021.01)

(58) Field of Classification Search
CPC ... B29C 64/268; B29C 64/386; B29C 64/153; B22F 3/1055; B22F 2003/1056
See application file for complete search history.

(56) References Cited

U.S. PATENT DOCUMENTS

| | | |
|---|---|---|
| 5,427,733 A | 6/1995 | Benda et al. |
| 2015/0375456 A1 | 12/2015 | Cheverton et al. |

(Continued)

FOREIGN PATENT DOCUMENTS

| | | |
|---|---|---|
| CN | 106273499 A | 1/2017 |
| CN | 106984813 A | 7/2017 |

(Continued)

OTHER PUBLICATIONS

European Search Report Corresponding to Application No. 19194706 dated Nov. 21, 2019.

(Continued)

*Primary Examiner* — Joseph S Del Sole
*Assistant Examiner* — Mohamed K Ahmed Ali
(74) *Attorney, Agent, or Firm* — Dority & Manning, P.A.

(57) ABSTRACT

Apparatus (1) for additively manufacturing of three-dimensional objects (2) by means of successive layerwise selective irradiation and consolidation of layers of a build material (3) which can be consolidated by means of an energy beam (4), wherein a measuring unit (5) is provided that is configured to generate information relating to a collimated part (6) of the energy beam (4) and information relating to a focused part (7) of the energy beam (4).

11 Claims, 1 Drawing Sheet

(51) Int. Cl.
    *B33Y 10/00*    (2015.01)
    *B28B 1/00*    (2006.01)
    *B22F 10/10*    (2021.01)

(56) References Cited

U.S. PATENT DOCUMENTS

| | | | |
|---|---|---|---|
| 2016/0236279 | A1 | 8/2016 | Ashton et al. |
| 2017/0036299 | A1 | 2/2017 | Goya et al. |
| 2017/0239892 | A1* | 8/2017 | Buller .................. B22F 3/1055 |
| 2017/0304947 | A1 | 10/2017 | Shibazaki |
| 2017/0341183 | A1* | 11/2017 | Buller .................. B29C 64/268 |
| 2018/0154443 | A1* | 6/2018 | Milshtein ............... B23K 26/10 |
| 2018/0186067 | A1* | 7/2018 | Buller ..................... B28B 1/001 |
| 2019/0061253 | A1 | 2/2019 | Zeulner et al. |

FOREIGN PATENT DOCUMENTS

| | | |
|---|---|---|
| CN | 206425548 U | 8/2017 |
| DE | 102012001609 B3 | 2/2013 |
| JP | 2009/083240 A | 4/2009 |
| JP | 2016/540109 A | 12/2016 |
| WO | WO2013/110467 A1 | 8/2013 |
| WO | 2015040433 A2 | 3/2015 |
| WO | WO2016/075802 A1 | 5/2016 |
| WO | WO2016/151740 A1 | 9/2016 |

OTHER PUBLICATIONS

European Search Report Corresponding to Application No. 171879943 dated Mar. 15, 2018.
Japanese Office Action Corresponding to Application No. 2018-016855.
Chinese Search Report and Office Action Corresponding to Application No. 201711238412 dated Apr. 20, 2020.
Machine Translated Japanese Search Report Corresponding to Application No. 2019175187 dated Aug. 6, 2020.

* cited by examiner

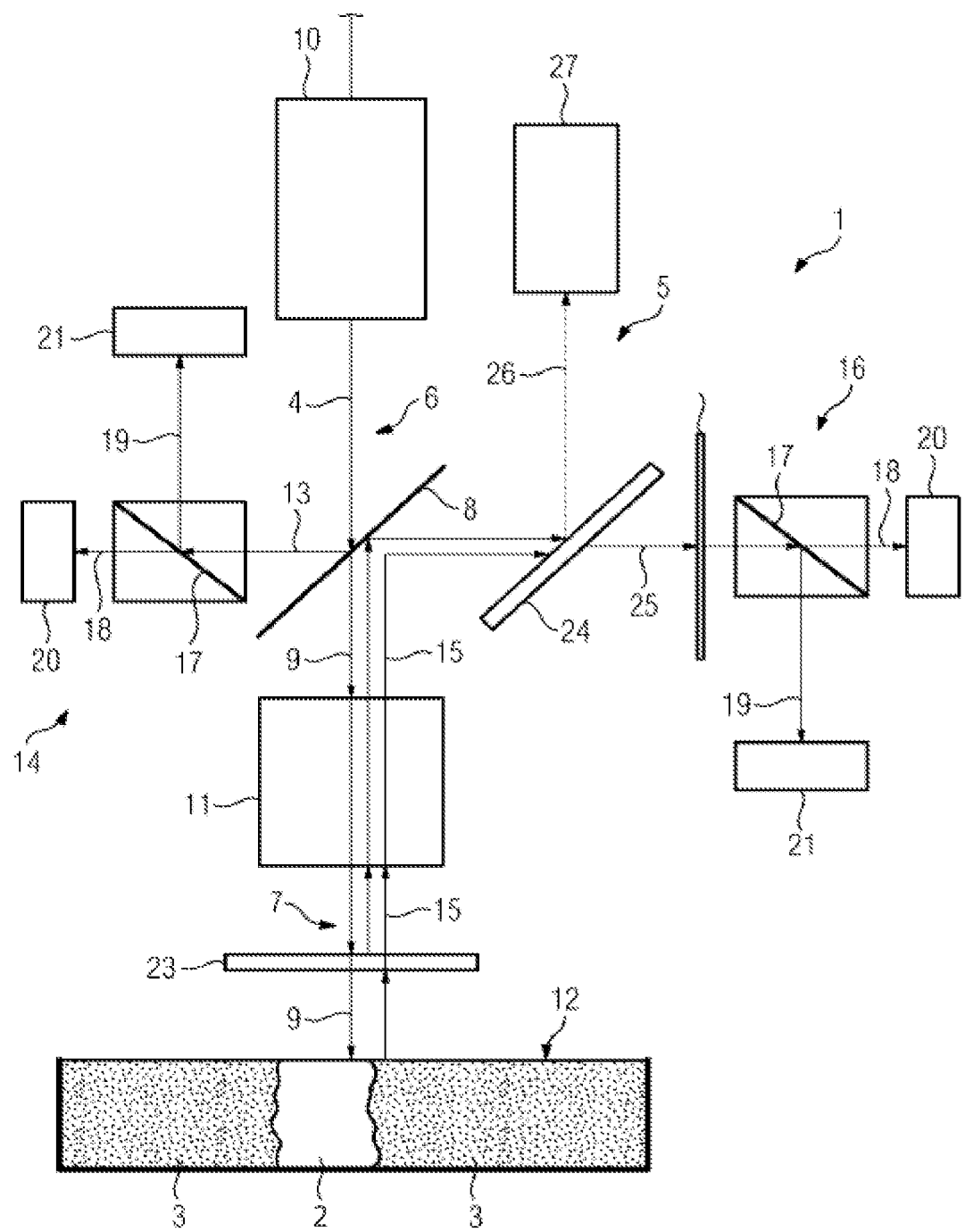

APPARATUS FOR ADDITIVELY MANUFACTURING OF THREE-DIMENSIONAL OBJECTS

CROSS-REFERENCE TO RELATED APPLICATIONS

This application claims priority to European Patent Application serial no. 17 187 994.3 filed Aug. 25, 2017, the contents of which is incorporated herein by reference in its entirety as if set forth verbatim.

The invention relates to an apparatus for additively manufacturing of three-dimensional objects by means of successive layerwise selective irradiation and consolidation of layers of a build material which can be consolidated by means of an energy beam.

Such apparatuses are well-known from prior art, wherein an energy beam is used to selectively irradiate layers of a build material, wherein the build material is consolidated due to the irradiation with the energy beam. To assure or maintain constant process quality, it is necessary to monitor different process parameters such as the power of the energy beam or the energy depleted in the build material via the energy beam.

For example, a shift in the focal position of the energy beam can occur due to a variation in the process temperature, e.g. the temperature of at least one component of the apparatus. Such temperature induced shifts in the focal position need to be corrected, otherwise the irradiation of the build material with the defocused energy beam leads to deviations in the object. Therefore, it is preferable to monitor and control various process parameters so as to ensure a constant process quality.

Therefore, it is an object to provide an apparatus, wherein the control of process parameters is improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive layerwise selective irradiation and consolidation of layers of a powdered build material ("build material") which can be consolidated by means of an energy beam. A respective build material can be a metal, ceramic or polymer powder. A respective energy beam can be a laser beam or an electronic beam. A respective apparatus can be a selective laser sintering apparatus, a selective laser melting apparatus or a selective electron beam melting apparatus, for instance.

The apparatus comprises a number of functional units which are used during its operation. Exemplary functional units are a process chamber, an irradiation device which is configured to selectively irradiate a build material layer disposed in the process chamber with at least one energy beam, and a stream generating device which is configured to generate a gaseous fluid stream at least partly streaming through the process chamber with given streaming properties, e.g. a given streaming profile, streaming velocity, etc.

The invention is based on the idea to provide a measuring unit comprising at least one measuring device that is configured to generate information relating to a collimated part of the energy beam and information relating to a focused part of the energy beam. Thus, multiple process parameters can be monitored, as not only information is generated that relates to a focused part of the energy beam, e.g. the part of the energy beam between a focusing optic and the build plane, but also information is generated that relates to a collimated part of the energy beam, e.g. the part of the energy beam between a collimating optic and a focusing optic. Therefore, a shift of the focal position of the energy beam or a shift of a focal length of at least one optical device or an optical component can be determined. This, for example, allows for adjusting at least one process parameter to at least partly compensate the shift of the focal position or the shift of the focal length.

Hence, by way of the invention it can be assured that constant process quality is met, since, for example, the focal position of the energy beam can be held constant allowing for a constant energy input into the build material that has to be irradiated.

According to an advantageous embodiment, the apparatus comprises:

a first beam splitter located between a collimating optic and a focusing optic, wherein a first optical beam path extends from the collimating optic through the focusing optic onto a build plane and a second optical beam path extends from the collimating optic to a first measuring device and a third optical beam path extends from the build plane and/or a surface between the build plane and the focusing optic through the focusing optic to a second measuring device, wherein the first measuring device is configured to generate information relating to a collimated part of the energy beam and wherein the second measuring device is configured to generate information relating to radiation emitted from a zone of the build plane and/or to generate information relating to a focused part of the energy beam.

Thus, a first beam splitter is used to split the energy beam that departs from a collimating optic into a first optical beam path and a second optical beam path, wherein the first optical beam path extends from the collimating optic through the focusing optic onto the build plane to irradiate the build material. The second optical beam path is split off the energy beam and extends from the collimating optic to a first measuring device. Further, a third optical beam path that extends from the build plane and/or a surface between the build plane and the focusing optic is guided via the first beam splitter to a second measuring device. This embodiment allows for a monitoring of various parts of the energy beam, wherein particular a collimated part of the energy beam between the collimating optic and the focusing optic and a focused part between the focusing optic and the build plane as well as radiation that is emitted from at least one zone of the build plane and/or from a surface between the focusing optic and the build plane can be evaluated.

The term "emission" or "emitted" in the scope of this application refers to radiation that is reflected or generated or the like, wherein radiation is released from the corresponding object or surface. Thus, "emission" is not restricted to the generation of radiation in terms of a beam source, but can also be understood as the reflection of radiation at a surface or (thermal) radiation emitted by an object of a defined temperature.

According to a further advantageous embodiment, the first measuring device comprises a second beam splitter configured to split the second energy beam traveling the second optical beam path into two sub-parts and/or the second measuring device comprises a second beam splitter configured to split the third energy beam traveling the third optical beam path into two sub-parts.

By splitting the second energy beam traveling the second optical beam path into two sub-parts and/or the third energy beam traveling the third optical beam path into two sub-parts it is possible to determine or measure whether the respective energy beam is collimated. In other words it is possible to detect the angle under which the rays of the single energy beams arrive on a detector assigned to the respective measuring device. Therefore, the diameter of the respective energy beam is measured in two different positions along the respective optical beam path the energy beam travels. By comparing the two diameters measured in the two different positions information can be generated relating to a collimation status of the energy beam.

Thus, it is possible to have a single detector or two detectors, wherein the two sub-parts are imaged onto the detector(s) in succession, for example using a shutter unit configured to blank out one of the sub-parts so that the other sub-part of the energy beam can be measured and vice versa. For example, a single detector can be movable between at least two measuring positions, wherein the diameter of the respective energy beam is measured in both positions and subsequently compared in that information can be generated relating to the collimation status of the respective energy beam. Hence, the optical path length of the two sub-parts that travel to the different measuring positions can be varied.

The apparatus can further be improved in that the first measuring device and/or the second measuring device comprise two optical sensors, wherein the first sub-part is measured via the first optical sensor and the second sub-part is measured via the second optical sensor.

According to this embodiment, the energy beam that is split up into two sub-parts is measured via different optical sensors, wherein the optical sensors are arranged in different positions, i.e. in different distances to the second beam splitter. In other words, the sub-parts of the respective energy beam travel different distances, i.e. the beam length or the optical path length is different for the two sub-parts. Thus, a beam diameter of the two sub-parts differs if the respective energy beam is not properly collimated. By providing this configuration it is possible to generate information relating to the collimation status of the respective energy beam and parameters of optical components, such as lenses, in particular a focal length of the collimating or the focusing optic.

Advantageously, the second measuring device comprises a dichroic beam splitter configured to split the third optical beam path into a first sub-path extending from an irradiated region of the build plane to a meltpool monitoring unit and a second sub-path reflected from a surface, in particular a protective glass of the focusing optic, between the focusing optic and the build plane to the second beam splitter of the second measuring device.

The dichroic beam splitter is configured to split the energy beam or split electromagnetic radiation in general incident on the dichroic beam splitter dependent on the wavelength of the electromagnetic radiation. Advantageously, the dichroic beam splitter can be configured to split merely a minor part or a defined amount of the third energy beam that results from a reflection of the energy beam, e.g. in the consolidation zone or reflected at a surface between the build plane and the focusing optic. The main part of the energy beam is able to pass the dichroic filter and travel to the second measuring unit.

Radiation that is emitted from adjacent zones around the consolidation zone is split off the third energy beam to a larger amount, e.g. radiation generated by heating zones adjacent to the consolidation zone indirectly due to thermal contact. For example, the dichroic splitter may be configured to selectively split off or reflect (thermal) radiation emitted from the build plane, e.g. in a wavelength spectrum from 250 nm to 3000 nm, wherein radiation of a wavelength of about 1070 nm is reflected only to a minor degree. Thus, if the energy beam is generated with a wavelength of about 1070 nm the energy beam can mainly pass the dichroic beam splitter, wherein only a minor amount of the energy beam is reflected by the dichroic beam splitter. Radiation that is emitted from the build plane, in particular zones adjacent to the consolidation zone, wherein the radiation is in a wavelength spectrum from 250 nm to 3000 nm, can pass the dichroic beam splitter only to a minor degree, wherein a larger amount is reflected by the dichroic beam splitter and therefore, guided towards the meltpool monitoring unit, wherein the radiation emitted from the build plane, i.e. a zone adjacent to the consolidation zone, can be measured or analyzed.

The apparatus can further be improved in that the information generated by the first measuring device comprises or relates to:
  the current beam power
  the current focal length of the collimating optic.

Thus, by measuring or analyzing the part of the energy beam extending along the second optical beam path it is possible to characterize the current beam power of the energy beam that has been collimated via the collimating optic and guided towards the first measuring unit. Further, it is possible to monitor or characterize the current focal length of the collimating optic and to monitor the effect of variations of the temperature on the collimating optic. Therefore, the embodiment allows for a monitoring of the collimation of the energy beam or in other words, whether it is necessary to correct the current focal length or the current focal position of the energy beam, e.g. due to temperature induced deviations.

According to another embodiment of the apparatus, the information generated by the second measuring device comprises or relates to:
  a current focal position
  a temperature in the irradiated region of the build plane
  an optical parameter, in particular the focal length, of the
    focusing optic.

Analog to the information described before, the monitoring performed by the second measuring unit allows for a determination of the current focal position or current optical parameters of the focusing optic, in particular the focal length of the focusing optic. Together with the determined focal length of the collimating optic it is possible to determine the focal length of the optical system comprising the focusing optic and the collimating optic. Besides, it is possible to determine a temperature of a zone of the build plane, wherein the zone may be the consolidation zone, in which the energy beam directly irradiates the build material to consolidate the build material and also the zone may be a zone adjacent to the consolidation zone, which stays in thermal contact with the consolidation zone, thereby heated indirectly via the energy beam.

By monitoring the temperature of the irradiated region a statement can be made regarding the quality of the object to be built, whereas defects in the object can be avoided by monitoring and respective controlling of process parameters to avoid high temperature gradients or temperature differences between adjacent zones of the object.

Another embodiment of the apparatus suggests a protective glass arranged between the focusing optic and the build plane, wherein the protective glass is configured to reflect at least a part of the energy beam. The protective glass provides a surface at which the energy beam is partly reflected extending along the third optical beam path. Thus, the reflection of the energy beam at the protective glass can be used to monitor the process parameters as the reflected part of the energy beam can be evaluated via the second measuring device. This allows for a characterization of the properties of the focused part of the energy beam as the part of the energy beam that is reflected at the protective glass already passed the collimating optic and the focusing optic.

The embodiment described before can be improved in that an optical diaphragm is provided that is located in a focal position of the part of the energy beam reflected by the protective glass. By way of this embodiment, a filtering of different parts of the energy beam or rays extending along undesired optical beam paths is enabled. Only part of the reflected energy beam that is reflected by the protective glass is able to pass the optical diaphragm that can be adjusted accordingly. Thus, radiation that is emitted from surfaces or regions that are not of interest as well as scattered radiation can be separated by the diaphragm from the parts of the energy beam that needs to be evaluated.

Another embodiment of the apparatus advantageously suggests that at least one information generated by the measuring unit is transferable to a quality management system. Thus, the information that is generated by the measuring unit can be stored in a data storage of a quality management system and/or processed further, for example to characterize the object to be built and/or record the process parameters during the manufacturing process of the object. This allows for a connection of object features with the corresponding manufacturing process or the parameters during the manufacturing process, respectively.

According to another advantageous embodiment, a control unit is provided that is configured to control at least one process parameter, in particular a focal position, of the energy beam dependent on at least one information generated by the measuring unit. Thus, an ("online-") evaluation and control of at least one process parameter is possible by monitoring the parts of the energy beam as described before. By monitoring the relevant process parameters during the manufacturing process of an object it is possible to correct or adjust a process parameter before the change of the process parameter, e.g. a change of the focal position, leads to deviations in the object that is currently manufactured. Thus, by evaluating the energy beam in its various parts, for example the focused part, the reflected part and the collimated part, it is possible to adjust the respective component and therefore, correct the respective parameter before a deviation occurs. Hence, a position or a relative position of an optical component, for example a lens, can be adjusted to compensate a shift in focal length or focal position due to temperature variations.

Besides, the invention relates to a method for operating an apparatus for additively manufacturing of three-dimensional objects by means of successive layerwise selective irradiation and consolidation of layers of a build material which can be consolidated by means of an energy beam, wherein information relating to a collimated part of the energy beam and information relating to a focused part of the energy beam is generated.

Self-evidently, all features, advantages and details described with respect to the apparatus are fully transferable to the method and vice versa. The method is preferably performed on an apparatus as described before.

According to an embodiment of the method, the energy beam is split between the collimating optic and the focusing optic into a first optical beam path that extends from the collimating optic through the focusing optic onto a build plane and a second optical beam path that extends from the collimating optic to a first measuring device and a third optical beam path that extends from the build plane and/or a surface between the focusing optic and the build plane through the focusing optic to a second measuring device, wherein information relating to a collimated part of the energy beam is generated by a first measuring device and wherein information relating to radiation emitted from a zone of the build plane and/or a surface between the focusing optic and the build plane and/or a focused part of the energy beam is generated by a second measuring device.

Thus, the energy beam exiting the collimating optic is split by a beam splitter before it passes through the focusing optic and guided to a first measuring device. Radiation that is reflected at the build plane and/or a surface that is arranged behind the focusing optic is guided by the beam splitter to a second measuring unit. This allows for a monitoring of the relevant beam parts, in particular a collimated part and a focused part and radiation that is emitted from a zone of the build plane and/or a surface between the build plane and the focusing optic.

An exemplary embodiment of the invention is described with reference to the FIGURE. The sole FIGURE is a schematic diagram and shows an inventive apparatus.

The FIGURE shows an apparatus 1 for additively manufacturing of three-dimensional objects 2 by means of successive layerwise selective irradiation and consolidation of layers of a build material 3 which can be consolidated by means of an energy beam 4. The apparatus 1 comprises a measuring unit 5 that comprises two measuring devices 14, 16 configured to generate information relating to a collimated part 6 of the energy beam 4 and information relating to a focused part 7 of the energy beam 4. The measuring devices 14, 16 are, therefore, configured to measure different parts 6, 7 of the energy beam 4 at the same time enabling the measuring unit 5 to generate information relating to the different parts 6, 7 of the energy beam 4.

The measuring unit 5 comprises a first beam splitter 8 that splits the energy beam 4, wherein a first optical beam path 9 extends from a collimating optic 10 through the first beam splitter 8 and a focusing optic 11 onto a build plane 12. The part of the energy beam 4 that extends along the first optical beam path 9 therefore, is not reflected by the first beam splitter 8 and is used to irradiate the build material 3 in the build plane 12.

The first beam splitter 8 splits a part off the energy beam 4 extending along a second optical beam path 13 from the collimating optic 10 to the first measuring device 14. Further, the first beam splitter 8 reflects a reflected part of the energy beam 4 that extends along a third optical beam path 15 from the build plane 12 or a surface between the build plane 12 and the focusing optic 11 through the focusing optic 11 to the second measuring device 16. Thus, the first beam splitter 8 is used to split the energy beam 4, wherein a first optical beam path 9 passes through the first beam splitter 8 and a second energy optical beam path 13 is reflected by the first beam splitter 8 to the first measuring device 14 and, wherein a third energy optical beam path 15 is reflected by the first beam splitter 8 to the second measuring device 16.

The first measuring device 14 comprises a second beam splitter 17 splitting the part of the energy beam 4 that extends along the second optical beam path 13 into a first sub-part 18 and a second sub-part 19, wherein the first sub-part 18 is imaged on a first optical sensor 20 and the second sub-part 19 is measured via a second optical sensor 21. The first optical sensor 20 and the second optical sensor 21 are arranged in different distances to the second beam splitter 17. Thus, the optical path lengths of the sub-parts 18, 19 of the part of the energy beam 4 extending along the second optical beam path 13 are different. This enables for measuring whether the collimated part 6 of the energy beam 4 is properly collimated or whether the focal length of the collimating optic 10 has to be adapted. Further parameters of the energy beam 4 and/or the collimating optic 10 can be measured via the optical sensors 20, 21 such as the power of the energy beam 4.

The setup of the second measuring device 16 is analog to the first measuring device 14. Therefore, same numerals are used for same parts. The second measuring device 16 also comprises a second beam splitter 17 and two optical sensors 20, 21, wherein the two optical sensors 20, 21 are arranged in different distances to the second beam splitter 17. The second beam splitter 17 of the second measuring device 16 also splits the part of the energy beam 4 incident on the second beam splitter 17 into a first sub-part 18 and a second sub-part 19.

Additionally, the second measuring device 16 comprises an optical diaphragm 22 that is arranged in a focal position of a part of the energy beam 4 reflected by a protective glass 23. The diaphragm 22 allows for a filtering of radiation, wherein only the part of the energy beam 4 that is reflected by the protective glass 23 is allowed to pass the optical diaphragm 22 and to pass on to the second beam splitter 17 of the second measuring device 16. Radiation other than the part of the energy beam 4 reflected at the protective glass 23 is blocked by the optical diaphragm 22.

The measuring unit 5 further comprises a dichroic beam splitter 24 assigned to the second measuring device 16, wherein the dichroic beam splitter 24 is configured in that radiation is selectively filtered (reflected) or passes through the dichroic beam splitter 24 dependent on the wavelength of the radiation. In particular, the part of the energy beam 4 that is emitted from a zone of the build plane 12 or reflected at the protective glass 23, i.e. extends along the third optical beam path 15, is filtered by the dichroic beam splitter 24 dependent on the wavelength. This allows for a filtering of the two different parts of the energy beam 4, i.e. the part reflected at the protective glass 23 or at the build plane 12 or a part emitted from a zone of the build plane 12, in particular thermal radiation. Thus, radiation that is emitted by the build plane 12, in particular by zones adjacent to a consolidation zone in which the energy beam 4 irradiates the build material 3 directly, can be measured.

Particularly, the dichroic beam splitter 24 can be designed in that the wavelength of the energy beam 4 is only reflected to a minor degree or in other words, radiation with a wavelength of the energy beam 4 can pass the dichroic beam splitter 24 in its greatest part. Thus, a part 25 of the energy beam 4 that passes the dichroic beam splitter 24 is mainly the part of the energy beam 4 that has been reflected at the protective glass 23 or at the consolidation zone passing through the focusing optic 11 and reflected at the first beam splitter 8. The part 25 of the energy beam 4 is guided to the second measuring device 16 and again filtered by the optical diaphragm 22 and, subsequently, split by the second beam splitter 17 into two sub-parts 18, 19 and imaged onto the optical sensors 20, 21.

Further, a part 26 (thermal radiation emitted by a zone of the build plane 12) is mainly reflected by the dichroic beam splitter 24 as the wavelength of the part 26 differs from the wavelength the dichroic beam splitter 24 is designed to let through. The part 26 is mainly emitted by the build plane 12, in particular by zones adjacent to the consolidation zone. The part 26 therefore, is emitted by the build plane 12 and passes through the protective glass 23 and the focusing optic 11. Subsequently, the part 26 is reflected by the first beam splitter 8 and the dichroic beam splitter 24 and guided to a meltpool monitoring unit 27. The meltpool monitoring unit 27 is configured to measure the part 26, in particular the meltpool monitoring unit 27 comprises at least one optical sensor (not shown), for example to determine the temperature of the zone of the build plane 12 the part 26 is emitted from.

As can be derived from the sole FIGURE the apparatus 1, in particular the measuring unit 5, allows for a determination of various parts of the energy beam 4 and radiation that is emitted from the build plane 12. In particular, it is possible to generate information relating to a collimated part 6 and a focused part 7 as well as a part 26 of radiation emitted from the build plane 12. This allows for a defined adjustment of various process parameters, in particular the focal lengths of the collimating optic 10 and the focusing optic 11 so as to avoid or correct focus shifts of the energy beam 4, for example due to temperature differences. Further, temperature gradients between the consolidation zone and adjacent zones can be determined by measuring the temperature in the consolidation zone and the adjacent zones. Thus, respective process parameters, in particular the power of the energy beam 4 can be adjusted, in particular reduced, if the determined temperature gradient exceeds a predefined value.

Self-evidently, the method described above may be performed on the apparatus 1 depicted in the FIGURE.

The invention claimed is:

1. Apparatus for additively manufacturing of three-dimensional objects by means of successive layerwise selective irradiation and consolidation of layers of a build material which is consolidated by means of an energy beam, characterized by a measuring unit comprising:
   a first beam splitter located between a collimating optic and a focusing optic;
   a first measuring device is configured to generate information relating to a collimated part of the energy beam;
   a protective glass arranged between the focusing optic and a build plane, wherein the protective glass is configured to reflect at least a part of a focused part of the energy beam before contacting the build plane; and
   a second measuring device configured to generate information relating to the focused part of the energy beam reflected from the protective glass.

2. Apparatus according to claim 1, wherein a first optical beam path extends from the collimating optic through the focusing optic onto the build plane and a second optical beam path extends from the collimating optic to the first measuring device and a third optical beam path extends from protective glass through the focusing optic to the second measuring device, wherein the first measuring device is configured to generate information relating to a current focal length of the collimating optic, and wherein the second measuring device is configured to generate information relating to a current focal position of the focusing optic and/or an optical parameter of the focusing optic.

3. Apparatus according to claim 2, characterized in that the first measuring device comprises a second beam splitter configured to split a second energy beam travelling the second optical beam path into two sub-parts and/or the second measuring device comprises a second beam splitter configured to split the part of the energy beam travelling the third optical beam path into two sub-parts.

4. Apparatus according to claim 3, characterized in that the first measuring device and/or the second measuring device comprise two optical sensors, wherein the first sub-part is measured via the first optical sensor and the second sub-part is measured via the second optical sensor.

5. Apparatus according to claim 4, characterized in that at least two optical sensors of the same measuring device are arranged in different distances and/or movable relative to the second beam splitter.

6. Apparatus according to claim 2, characterized in that the second measuring device comprises a dichroic beam splitter configured to split radiation traveling the third optical beam path into a first sub-path extending from a zone of the build plane to a meltpool monitoring unit and a second sub-path reflected from a surface between the focusing optic and the build plane to the second beam splitter of the second measuring device.

7. Apparatus according to claim 1, characterized in that the information generated by the first measuring device comprises or relates to:
   a current beam power and/or
   a current focal length of the collimating optic.

8. Apparatus according to claim 1, characterized in that the information generated by the second measuring device comprises or relates to:
   a current focal position and/or,
   an optical parameter of the focusing optic.

9. Apparatus according to claim 1, characterized by an optical diaphragm located in a focal position of the energy beam reflected by the protective glass.

10. Apparatus according to claim 1, characterized in that at least one information generated by the measuring unit is transferable to a quality management system.

11. Apparatus according to claim 1, characterized by a control unit configured to control at least one process parameter of the energy beam dependent on at least one information generated by the measuring unit.

* * * * *